US008325407B2

(12) United States Patent
Kawano et al.

(10) Patent No.: US 8,325,407 B2
(45) Date of Patent: Dec. 4, 2012

(54) OSCILLATING DEVICE, OPTICAL SCANNING DEVICE USING THE SAME, IMAGE DISPLAY APPARATUS, AND CONTROL METHOD OF THE OSCILLATING DEVICE

(75) Inventors: Kiyohiko Kawano, Kadoma (JP); Hiroshi Noge, Tokyo (JP); Hideki Ueda, Kadoma (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 12/600,916

(22) PCT Filed: Mar. 23, 2008

(86) PCT No.: PCT/JP2008/059506
§ 371 (c)(1),
(2), (4) Date: Nov. 19, 2009

(87) PCT Pub. No.: WO2008/146722
PCT Pub. Date: Dec. 4, 2008

(65) Prior Publication Data
US 2010/0171744 A1 Jul. 8, 2010

(30) Foreign Application Priority Data
May 23, 2007 (JP) ................. 2007-137195

(51) Int. Cl.
*G02B 26/08* (2006.01)

(52) U.S. Cl. .................................................. 359/224.1

(58) Field of Classification Search .... 359/212.1–214.1, 359/223.1–226.1, 290, 291, 871
See application file for complete search history.

(56) References Cited

U.S. PATENT DOCUMENTS
5,959,760 A  9/1999 Yamada et al.
(Continued)

FOREIGN PATENT DOCUMENTS
JP      11-52278      2/1999
(Continued)

OTHER PUBLICATIONS
Japan Office action, mail date is Jun. 14, 2011, with partial English translation.
(Continued)

*Primary Examiner* — Euncha Cherry
(74) *Attorney, Agent, or Firm* — Greenblum & Bernstein P.L.C.

(57) ABSTRACT

Provided is an oscillating device, which can adjust the oscillation angle and the phase of a movable plate easily with a simple constitution. A light scanning device acting as the oscillating device comprises a mirror element for oscillating the movable plate having a mirror film, a control circuit having a duty ratio adjusting unit and a function to change the duty ratio of the pulse voltage, so that it applies the pulse voltage thereby to drive a vertical comb of the mirror element, and an oscillation detecting unit for detecting the oscillations of the movable plate. On the bases of the movable plate oscillations detected by the oscillation detecting unit, the control circuit controls the duty ratio adjusting unit thereby to change the duty ratio of the pulse voltage. When the pulse voltage having the changed duty ratio is applied to the mirror element, the period of applying the voltage to the vertical comb at the oscillating time of the movable plate changes so that the phase and the oscillation angle of the oscillations of the movable plate change. By the feed-back control of the duty ratio according to the oscillations of the movable plate, the movable plate can be controlled to oscillate in the proper phase and at the proper oscillation angle.

10 Claims, 3 Drawing Sheets

U.S. PATENT DOCUMENTS

| | | | |
|---|---|---|---|
| 2002/0005976 A1* | 1/2002 | Behin et al. | 359/254 |
| 2002/0138998 A1 | 10/2002 | Hamada | |
| 2004/0041782 A1 | 3/2004 | Tachibana | |
| 2005/0030606 A1 | 2/2005 | Nakajima | |
| 2005/0185237 A1 | 8/2005 | Nakajima | |

FOREIGN PATENT DOCUMENTS

| | | |
|---|---|---|
| JP | 2002-296033 | 10/2002 |
| JP | 2004-20873 | 1/2004 |
| JP | 2004-20975 | 1/2004 |
| JP | 2005-202321 | 7/2005 |
| JP | 2005-237094 | 9/2005 |
| JP | 2005-345866 | 12/2005 |
| JP | 2006-195181 | 7/2006 |
| JP | 2007-121467 | 5/2007 |

OTHER PUBLICATIONS

EPO Search Report, mail is Apr. 12, 2012.

* cited by examiner

OSCILLATING DEVICE, OPTICAL SCANNING DEVICE USING THE SAME, IMAGE DISPLAY APPARATUS, AND CONTROL METHOD OF THE OSCILLATING DEVICE

TECHNICAL FIELD

The present invention relates to an oscillating device using a movable structure in which a pulse voltage is applied to a vertical comb so that a movable plate oscillates around a rotation axis, an optical scanning device using the oscillating device, an image display apparatus using the optical scanning device, and a control method of the oscillating device.

BACKGROUND ART

Conventionally, some optional equipments such as bar code readers and image display apparatuses, for example, mounts an optical scanning device for oscillating a movable plate provided with a mirror to scan an optical beam which enters the mirror. As shown in Japanese Laid-Open Patent Publication No. 2005-202321, for example, there is a well known optical scanning device which has a small movable structure formed with micromachining technique. In the movable structure, a movable plate is held by beam-like springs which are supported by a surrounding frame. A vertical comb which is made up of comb-like electrodes, which are formed on the frame and the movable plate to engage with each other, is provided between the frame and the movable plate. The movable plate twists the springs and oscillates around the springs, which are to be a rotation axis, by using electrostatic force, which is generated in the vertical comb by applying a pulse voltage having a frequency corresponding to resonant frequency of the movable plate, as a driving force, for example. At this time, when the rotation of the movable plate brings the comb-like electrodes closer to each other, the voltage is applied to an electrostatic comb, and when the rotation of the movable plate gets the comb-like electrodes away from each other, the voltage is not applied. A duty ratio of the pulse voltage is adjusted to approximately 50% so that the pulse voltage synchronized with an oscillation angle of the movable plate is applied to the electrostatic comb as described above.

When the movable plate actually oscillates in the above optical scanning device, a phase shifting often occurs between a phase of the pulse voltage and a phase of the oscillation of the movable plate. For example, when entering a light which is synchronized with the pulse voltage in the optical scanning device which is used for displaying an image, the phase shifting often causes a misalignment of a projection position of an image displayed by the image display apparatus and also causes a reduction in quality of the projected image. Moreover, when the phase shift occurs, the voltage is applied to the vertical comb during a period when the rotation of the movable plate gets the comb-like electrodes away from each other, and an electrostatic force which acts in a direction to control the rotation of the movable plate occurs. When such an electrostatic force occurs, the oscillation angle of the movable plate becomes smaller comparatively for the magnitude of the pulse voltage. Consequently, a large image cannot be displayed efficiently to meet the magnitude of the applied voltage, and moreover, the oscillation angle of the movable plate also becomes small by reason that a maximum value of the pulse voltage applied to the vertical comb is limited to control the electrostatic force, which acts on the vertical comb in the lateral direction. There are some possible solutions that the phase of the pulse voltage is adjusted, a timing for entering the light is shifted, and so on to the above problem. However, when entering the light which is synchronized with the pulse voltage in the optical scanning device, a control is required to change the timing for entering the light as well as changing the phase of the pulse voltage, so that the control process becomes complex.

In Japanese Laid-Open Patent Publication No. 2005-202321, there is a disclosure of an optical scanning device in which two types of electrodes are provided to torque a movable plate so that the movable plate can turn at a predetermined frequency even when resonant frequencies vary. However, when applying the configuration of the optical scanning device to deal with the above problem, the separate pulse voltages are applied to the two types of electrodes to drive the optical scanning device, so that the structure of the movable structure becomes complex, and moreover, the configuration and the control process of the optical scanning device become complex and a production cost increases.

DISCLOSURE OF INVENTION

In order to solve the problem of the conventional art described above, an object of the present invention is to provide an oscillating device which can easily adjust an oscillation angle and phase of a movable plate with a simple configuration, an optical scanning device using the oscillating device, an image display apparatus using the optical scanning device, and a control method of the oscillating device.

An oscillating device according to one aspect of the present invention includes a movable structure having a movable plate, torsion springs to pivotally support the movable plate, a frame to support the torsion springs, and a vertical comb with plural comb teeth provided on a part of the movable plate and the frame, which faces with the movable plate, to engage with each other and a voltage applying means to apply a pulse voltage to a comb-like electrode of the vertical comb on the movable plate and a comb-like electrode of the vertical comb on the frame, wherein the voltage applying means includes a duty ratio adjusting means which adjusts a duty ratio of the pulse voltage applied to the vertical comb.

An optical scanning device according to one aspect of the present invention includes the above oscillating device, and a movable plate in the oscillating device has a mirror to scan a light which enters the mirror.

An image display apparatus according to one aspect of the present invention includes the above optical scanning device and a light source unit to enter the light in the optical scanning device based on image signals and displays an image by reflecting the light which is entered from the light source unit using the optical scanning device, wherein the duty ratio adjusting means is controlled according to a timing of the image signals so that a duty ratio of a pulse voltage is adjusted.

According to such a configuration, when driving the movable plate, the duty ratio of the pulse voltage can be adjusted by the duty ratio adjusting means, so that the period for applying the voltage can be changed when oscillating the movable plate. Consequently, the oscillation angle and phase of the movable plate in the oscillating device can be adjusted, and a scan range of the light, for example, can thereby be changed easily in the optical scanning device. Moreover, the phase of the movable plate can be changed according to the timing of the light outputted from the light source unit in the image display apparatus, and the movable plate can be oscillated automatically to display the image properly. Furthermore, the oscillation angle and phase of the movable plate can be adjusted by changing the duty ratio of the pulse voltage even when the movable structure does not have a specific structure but have a simple configuration.

In contrast, a control method of the oscillating device according to one aspect of the present invention have a movable structure including a movable plate, torsion springs to pivotally support the movable plate, a frame to support the torsion springs, and a vertical comb with plural comb teeth provided on a part of the movable plate and the frame, which faces with the movable plate, to engage with each other and swingably drives the movable plate by applying a pulse voltage to a comb-like electrode of the vertical comb on the movable plate and a comb-like electrode of the vertical comb on the frame, wherein by adjusting a duty ratio of the pulse voltage, a period for applying the voltage to the vertical comb is changed when the movable plate is oscillated and a phase of the oscillation of the movable plate is also changed.

According to such a control method of the oscillating device, the movable plate of the movable structure is driven by adjusting the duty ratio of the pulse voltage applied to the vertical comb, so that the period for applying the voltage is changed when oscillating the movable plate, and the phase of the movable plate can thereby be changed. Accordingly, the oscillation angle and phase of the movable plate can be adjusted by changing the duty ratio of the pulse voltage even when the movable structure does not have a specific structure but have a simple structure.

BEST MODE FOR CARRYING OUT THE INVENTION

Figure 1:
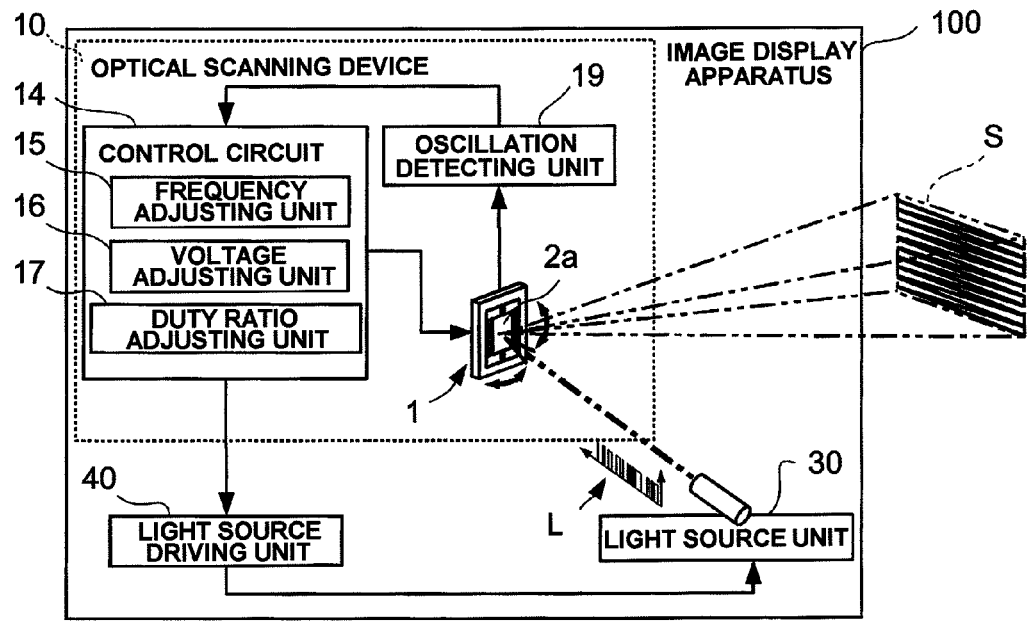
FIG. 1 is a block diagram showing a configuration of an image display apparatus according to a preferred embodiment of the present invention.

An image display apparatus which uses an oscillating device according to a preferred embodiment of the present invention as an optical scanning device is described with reference to the drawings. FIG. 1 shows a configuration example of the image display apparatus according to the present preferred embodiment. An image display apparatus 100 is made up of a mirror element 1 as a movable structure, an optical scanning device 10 as an oscillating device having a control circuit (voltage applying means) 14 which applies a voltage to drive the mirror element 1, a light source unit 30 which enters a light in the mirror element 1, a light source driving unit 40 which drives the light source unit 30, a power source unit which supplies a power source and drives the various units in the image display apparatus (not shown), and so on. The image display apparatus 100 has functions of outputting a light L from the light source unit 30 to the mirror element 1 in accordance with an image data inputted from outside under control of the control circuit 14, scanning the light 1 by making the mirror element 1 reflect the light L on an external projection plane, and projecting an image S on the external projection plane for example.

The optical scanning device 10 includes the mirror element 1, the control circuit 14, and an oscillation detecting unit (oscillation detecting means) 19. The control circuit 14 has a frequency adjusting unit (control means) 15, a voltage adjusting unit (control means) 16, and a duty ratio adjusting unit (duty ratio adjusting means) 17. In the present preferred embodiment, a mirror element which can scan the light L two-dimensionally, in other words, a two axis element, is used as the mirror element 1, however, in the following description, a one axis mirror element 1 is used as an example, so that its structure and control is described more simply.

Figure 2:
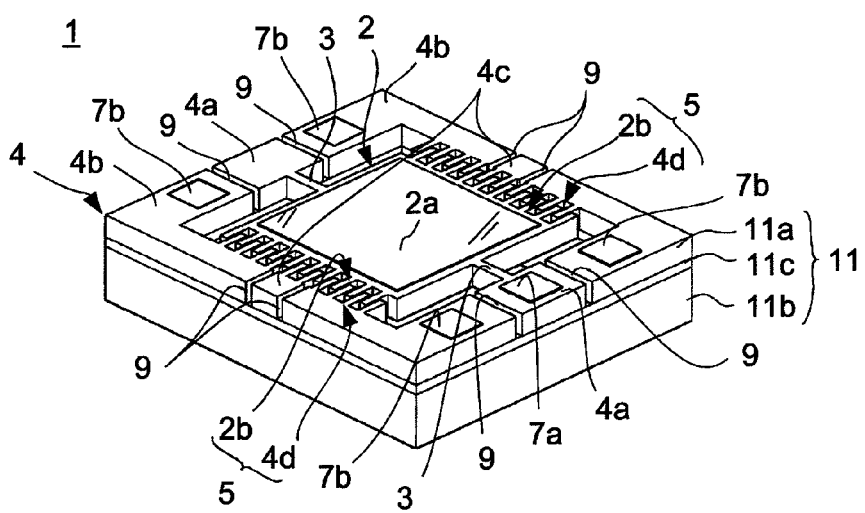
FIG. 2 is a perspective view showing a mirror element used in an optical scanning device of the image display apparatus in FIG. 1.
Figure 3A:
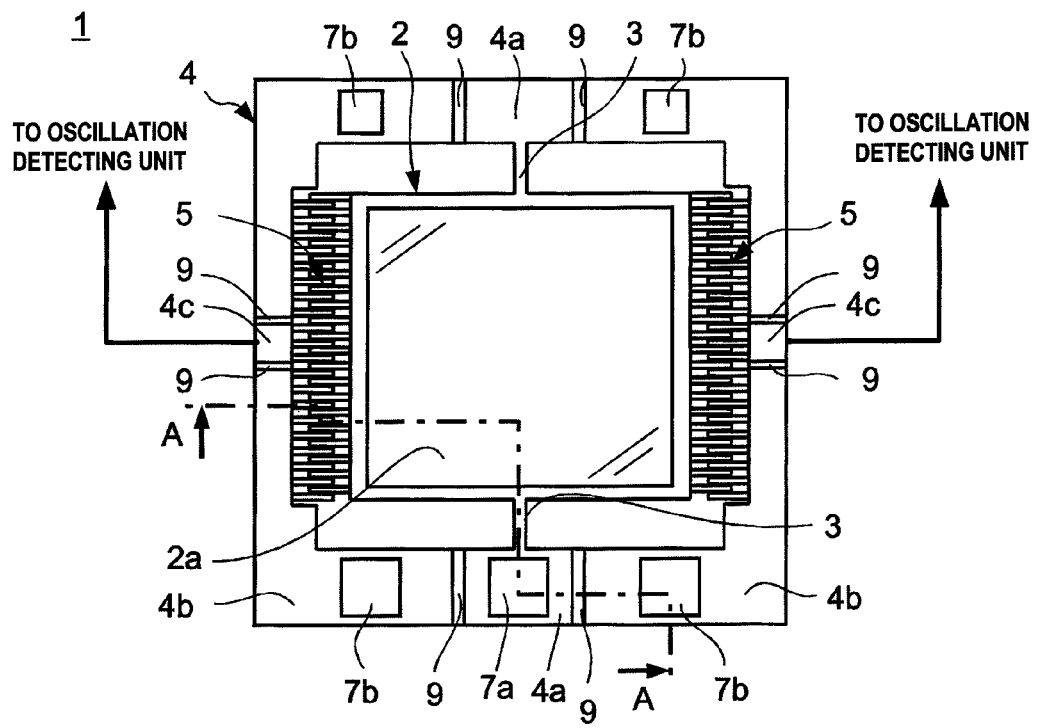
FIG. 3A is a plane view of the mirror element in FIG. 1.
Figure 3B:
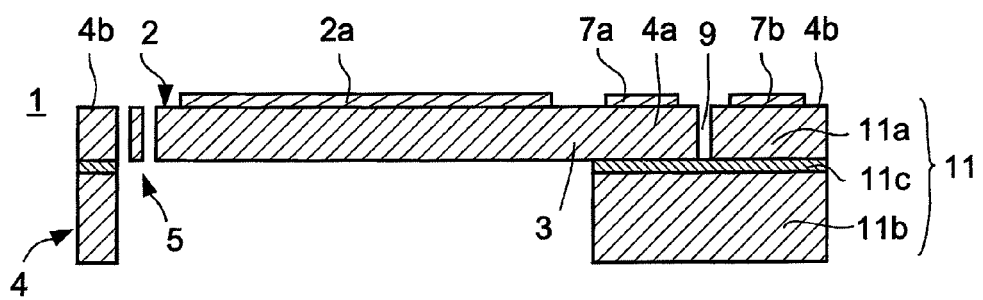
FIG. 3B is a cross sectional view of FIG. 3A along the line A-A.

FIGS. 2, 3A, and 3B show the mirror element 1. The mirror element 1 is made up of a small movable structure which is made by forming a SOI substrate 11, which includes conductive silicon layers 11a and 11b and an insulating oxide film layer 11c, for example, with micromachining technique, for example. The oxide film layer 11c is connected between the silicon layer 11a and the silicon layer 11b, so that the silicon layer 11a and the silicon layer 11b are insulated from each other. The mirror element 1 substantially has a rectangular shape and has a movable plate 2 which substantially has a rectangular shape in a central part of the mirror element 1. Torsion springs 3 which have beam-like shapes, respectively, are on the same axis on both sides of the movable plate 2. A frame 4 is formed around the movable plate 2 to surround the movable plate 2. The torsion springs 3 are supported by the frame 4. That is to say, the movable plate 2 is swingably supported by the frame 4 via the torsion springs 3. A vertical comb 5 is formed on a free edge of the movable plate 2, which is located on a side of the movable plate 2 where the torsion springs 3 are not formed and is thereby free when the movable plate is oscillated, and on a part of the frame 4 which faces with the free edge. The vertical comb 5 has a comb-like shape to engage with each other and drives the movable plate 2. As shown in FIG. 3B, the movable plate 2, the torsion springs 3, and the vertical comb 5 are formed in a silicon layer 11a. The frame 4 is made up of the silicon layer 11a, an oxide film layer 11c, and a silicon layer 11b. When the movable plate 2 is not driven and but stationary, the movable plate 2, the torsion springs 3, and the frame 4 are horizontally disposed substantially.

A gravity center of the movable plate 2 is located adjacent to the axis on which the two torsion springs 3, which are disposed on the both sides of the movable plate 2, are arranged, and when the vertical comb 5 is driven as described below, the movable plate 2 oscillates around the axis on which the torsion springs 3 are arranged. A mirror film (mirror) 2a is formed on an upper surface of the movable plate 2 to reflect the light and so on entered from outside, for example. The mirror film 2a is a metal film made of aluminum, gold, or the like which is selected in accordance with a type of the light L outputted from the light source unit 30, for example.

The frame 4 includes supporting units 4a which support the torsion springs 3, two fixed electrodes 4b on which the vertical comb 5 is formed, and detecting electrodes 4c which are made by separating a part of the fixed electrodes 4b including a part of the vertical comb 5. The fixed electrodes 4b surround two side edges which are free when the movable plate 2 is oscillated in the movable plate 2, respectively. The supporting units 4a, the fixed electrodes 4b, and the detecting electrodes 4c are electrically insulated by insulation trenches 9 which are made by removing a part of the silicon layer 11a between the supporting unit 4a and the fixed electrode 4b and between the fixed electrode 4b and the detecting electrode 4c. Electrode pads 7a and 7b are formed on the supporting unit 4a and the fixed electrodes 4b, respectively, so that potentials of the supporting unit 4a and fixed electrodes 4b can be changed separately. The electrode pads 7a and 7b are made up of a metal film identical with the mirror film 2a, for example.

The vertical comb 5 includes plural comb-like electrodes 2b which are formed on side edges of the movable plate 2 and plural comb-like electrodes 4d which are formed on a part of the fixed electrodes 4b and detecting electrodes 4c, which face with the side edges of the movable plate 2. In the vertical comb 5, the comb-like electrodes 2b and 4d are disposed to engage with each other with keeping a gap of a few micrometers, for example. The vertical comb 5 is driven when the potential of the comb-like electrode 4d on the fixed electrode 4b is changed and the pulse voltage is subsequently applied to the comb-like electrodes 2b and 4d in a condition that the comb-like electrode 2b on the movable plate 2 is connected to a ground potential via the electrode pad 7a on the frame 4, for example. The potential of the comb-like electrode 4d is changed by the control circuit 14 via the electrode pad 7b. When the voltage is applied to the comb-like electrodes 2b and 4d in the vertical comb 5, an electrostatic force, which makes the comb-like electrodes 2b and 4d attract each other, is generated between the comb-like electrodes 2b and 4d. When the force which is generated by driving the vertical comb 5 acts on the side edges of the movable plate 2 at a substantially right angle with the movable plate 2, an electrostatic torque is added to the movable plate 2, and the movable plate 2 is driven swingably.

The mirror element 1 is formed in the following manner, for example. At first, when the SOI substrate 11 is processed by a so-called bulk micromachining technique, the movable plate 2, the torsion springs 3, the frame 4, the vertical comb 5, and so on are formed in the SOI substrate 11, and the plural movable structures are thereby formed. Subsequently, the metal film is formed on the upper surface of the silicon layer 11a in the SOI substrate 11 by using a sputtering method or the like. When a pattering is performed on the metal film, the mirror film 2a is formed on the upper surface of the movable plate 2 and the electrode pads 7a and 7b are formed on the upper surface of the frame 4. After the mirror film 2a and the electrode pads 7a and 7b are formed, the SOI substrate 11 and a supporting substrate such as glass or the like which supports the SOI substrate 11 are connected with each other by an anodic bonding, for example. Subsequently, the plural mirror elements 1 formed on the SOI substrate 11 are cut and separated. Through the above series of process, the plural mirror elements 1 can be manufactured at one time and the cost of manufacturing the mirror element 1 can thereby be reduced. The manufacturing process of the mirror element 1 is not limited to the above, however, the mirror elements 1 can be formed by a laser processing or an ultrasonic processing, for example, or can also be formed one by one.

The control circuit 14 applies the pulse voltage to the vertical comb 5 and drives the mirror element 1 by changing the potential of the electrode pad 7b of the mirror element 1 periodically. The frequency adjusting unit 15, the voltage adjusting unit 16, and the duty ratio adjusting unit 17 have functions of changing the frequency of the pulse voltage applied to the mirror element 1, changing a voltage value which is amplitude of the pulse voltage, and changing the duty ratio of the pulse voltage, respectively. In the present preferred embodiment, the oscillation detecting unit 19 is connected with the detecting electrode 4c by a wire bonding technique, for example. When the movable plate 2 oscillates, the oscillation detecting unit 19 detects an electrostatic capacitance between the comb-like electrode 4d of the detecting electrode 4c and the comb-like electrode 2b of the movable plate 2 and inputs the electrostatic capacitance in the control circuit 14. The control circuit 14 detects the oscillation phase of the movable plate 2 by using the oscillation detecting unit 19. That is to say, for example, the control circuit 14 is adapted to determine that when the electrostatic capacitance detected by the oscillation detecting unit 19 reaches its peak, "the overlap" between the comb-like electrodes 2b and 4d becomes largest in a condition that the movable plate 2 is substantially horizontal and detect the phase of the movable plate 2.

The light source unit 30 is made up of a laser diode element, lens, and so on, for example, and is disposed to output the light L toward the mirror film 2a of the optical scanning device 10. When the light source driving unit 40 receives image signals, which is based on image data from outside, from the control circuit 14, the light source driving unit 40 applies the voltage to the light source unit 30 in accordance with the image signals and outputs the light L from the light source unit 30 to the mirror element 1. That is to say, the light source unit 30 receives the voltage from the light source driving unit 40 according to the control of the control circuit 14 and outputs the light L. In the present preferred embodiment, the control circuit 14 generates the image signals which is synchronized with the pulse voltage applied to the mirror element 1 in accordance with the image data from outside and controls the output of the light L which is outputted from the light source unit 30. Consequently, the light L is outputted from the light source unit 30 in accordance with the oscillation of the movable plate 2 of the mirror element 1, the light L is scanned on the external projection plane by the mirror element 1, and an image S (refer to FIG. 1) is thereby projected on the external projection plane.

Figure 4:
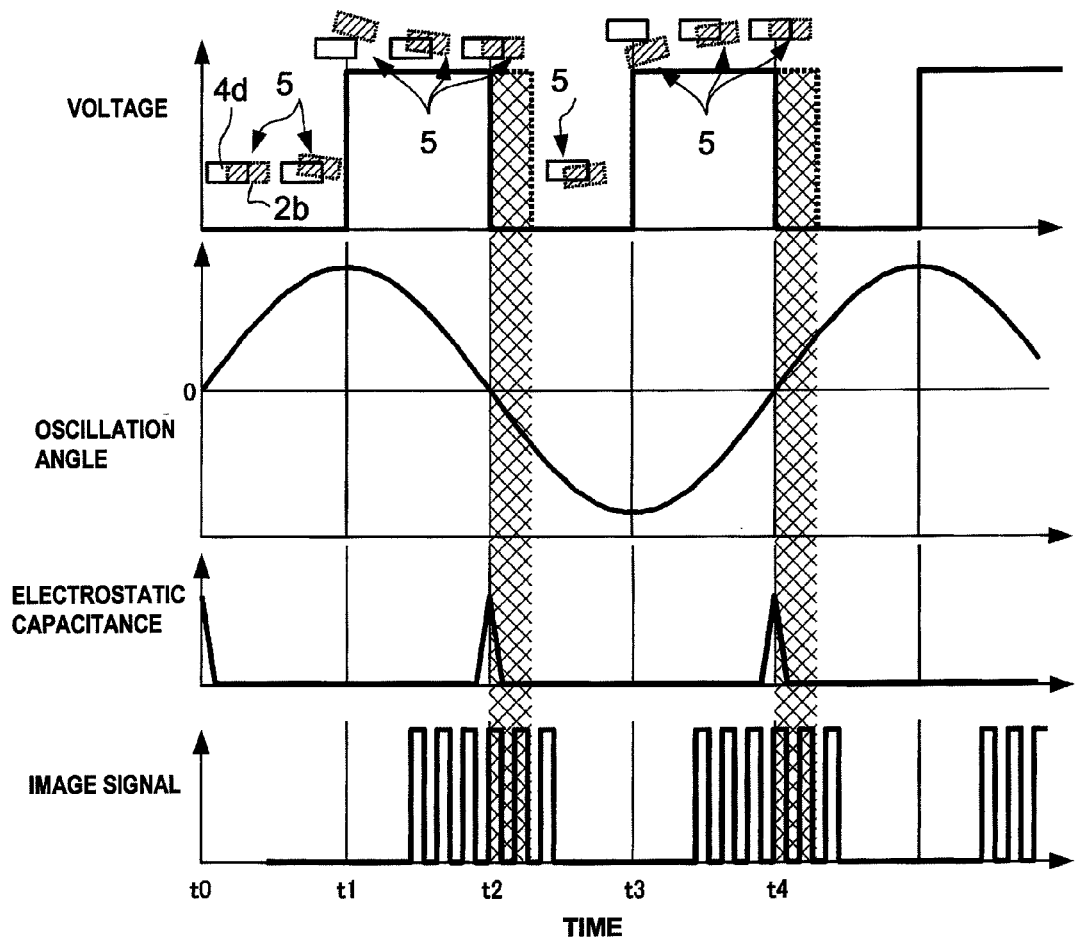
FIG. 4 is a time chart showing an example of an operation of the optical scanning device in FIG. 2.

Subsequently, the performance of the image display apparatus 100 having the above configuration is described with reference to FIG. 4. FIG. 4 shows a relationship among an oscillation angle of the movable plate 2 with respect to the horizontal surface, the pulse voltage, the electrostatic capacitance detected by the oscillation detecting unit 19, and the image signals when the light source driving unit 40 drives the light source unit 30 as time advances in a condition that the mirror element 1 is steadily driven. Pose variations of the comb-like electrodes 2b and 4d in various points of time are illustrated at the top of FIG. 4.

When a rectangular wave pulse voltage is applied from the control circuit 14 to the vertical comb 5, the vertical comb 5 generates the driving force at a predetermined drive frequency, and the movable plate 2 of the mirror element 1 is driven. At this time, the pulse voltage is set to a predetermined reference drive voltage (tens of volts, for example), and the potential of the two comb-like electrodes 4d in the vertical comb 5 change to the reference drive voltage simultaneously. The electrostatic force generated through the above process makes the two comb-like electrodes 2b which are provided on the side edges of the movable plate 2 be pulled to the comb-like electrodes 4d which face with the respective comb-like electrodes 2b simultaneously.

In many cases, the above movable plate 2 does not generally keep a horizontal attitude even in static condition but inclined very slightly by reason that a dimensional error and so on occur during the formation of the movable plate 2. Accordingly, once the vertical comb 5 is driven, a driving force which is substantially perpendicular to the movable plate 2 is added to the movable plate 2, and even from the static condition, the movable plate 2 oscillates around the axis on which the torsion springs 3 are arranged. Subsequently, when the application of the voltage to the vertical comb 5 is stopped to cancel the driving force at a time when the movable plate 2 is in a position that the comb-like electrodes 2b and 4d overlap with each other, the movable plate 2 twists the torsion springs 3 and continues oscillating by inertial force. Then, when the inertial force of the movable plate 2 in the oscillation direction becomes equal to a restoring force of the torsion springs 3, the movable plate 2 stops oscillating in the above oscillation direction (refer to the times of t1, t3, . . . in FIG. 4). At this time, the vertical comb 5 is driven again, and the movable plate 2 starts oscillating in the opposite direction from the previous one by the restoring force of the torsion springs 3 and the driving force of the vertical comb 5. Subsequently, when the movable plate 2 is again in the position that the comb-like electrodes 2b and 4d overlap with each other, the driving force of the vertical comb 5 is canceled (refer to times of t0, t2, t4, . . . in FIG. 4), and the movable plate 2 continues oscillating by the inertial force. The movable plate 2 repeats the oscillation generated by the driving force of the vertical comb 5 and the restoring force of the torsion springs 3 described above. The vertical comb 5 is applied with the voltage having a frequency, which is substantially twice as large as resonant frequency of a resonance system which is made up of the movable plate 2 and the torsion springs 3, and is thereby driven. According to the above configuration, the movable plate 2 is driven with resonance phenomenon, so that the oscillation angle of the movable plate 2 becomes large.

In the present preferred embodiment, the image signals is adapted to be synchronized with pulse signals, and the light is outputted from the light source unit 30 in synchronization with the pulse signals. That is to say, for example, the control circuit 14 sends out the image signals to the light source driving unit 40 at the time when a change in an angular acceleration of the oscillation of the movable plate 2 becomes smaller and controls the output of the light L which is outputted from the light source unit 30. The image signals are sent to the light source driving unit 40 a predetermined amount of time after the voltage starts to be applied to the vertical comb 5, in other words, a predetermined mount of time after the times of t1, t3, . . . in FIG. 4. According to the above configuration, the image display apparatus 100 is adapted to be able to project the image S in a proper position on the external projection plane with a proper size.

At this time, in the present preferred embodiment, the control circuit 14 controls the frequency adjusting unit 15, the voltage adjusting unit 16, and the duty ratio adjusting unit 17 in accordance with the oscillation of the movable plate 2 detected by the oscillation detecting unit 19 and adjusts the frequency, voltage, and duty ratio of the pulse voltages applied to the mirror element 1. An example of a control performed by the control circuit 14 in driving the mirror element 1 is described hereinafter.

As shown by the times of t0, t2, t4, . . . in FIG. 4, when the oscillation angle of the movable plate 2 is zero and the comb-like electrodes 2b and 4d substantially overlap with each other, the control circuit 14 detects a peak value of the electrostatic capacitance by the oscillation detecting unit 19. In this manner, the control circuit 14 detects the phase of the oscillating movable plate 2. When it is determined that the phase of the movable plate 2 departs from a predetermined phase difference which enables the image to be projected properly as a result of comparison with the phase of the pulse voltage, the control circuit 14 controls the duty ratio adjusting unit 17. As shown by a dotted line in FIG. 4, for example, the control is performed by increasing and decreasing the duty ratio of the pulse voltage so that the phase difference between the movable plate 2 and the pulse voltage is corrected to be the predetermined phase difference. In other words, the control circuit 14 controls the duty ratio adjusting unit 17 in accordance with the phase of the pulse voltage, that is the timing of the image signals, and the phase of the movable plate 2 and also adjusts the duty ratio of the pulse voltage. Moreover, the control circuit 14 controls the voltage adjusting unit 16 in accordance with the variation of the duty ratio and increases and decreases the voltage value of the pulse voltage by the predetermined amount of correction, for example. When the frequency of the oscillation of the movable plate 2 also varies from a predetermined frequency in addition to the phase difference, the control circuit 14 also controls the frequency adjusting unit 15 to change the frequency of the pulse voltage in addition to the duty ratio and the voltage, so that the oscillation of the movable plate 2 is controlled to have the predetermined frequency.

As a result of changing the duty ratio and so on, the timing of applying the voltage to the vertical comb 5, the voltage applied to the vertical comb 5, and so on change, so that the oscillation phase of the movable plate 2 changes. In the present preferred embodiment, the phase of the oscillating movable plate 2 is detected, and base on this, a feedback control is performed to change the duty ratio and voltage of the pulse voltage so that the above phase difference becomes equal to the predetermined phase difference. By performing the feedback control in this manner, the phase of the image signals and the oscillation phase of the movable plate 2 can be synchronized with each other again, so that the image can be displayed properly.

When increasing the duty ratio at this time, the voltage is applied to the vertical comb 5 also in the period that the movable plate 2 oscillates in the direction that the comb-like electrodes 2b and 4d get away from each other after the oscillation angle of the movable plate 2 becomes zero (refer to periods after the times of t2 and t4, shaded periods in FIG. 4). In this case, the driving force of the vertical comb 5 is acted in the direction of preventing the oscillation of the movable plate 2, and the decrease of the oscillation angle of the movable plate 2 can occur. In contrast, when decreasing the duty ratio, the application of the voltage to the vertical comb 5 is canceled in the period that the movable plate 2 oscillates in the direction that the comb-like electrodes 2b and 4d get close to each other (refer to periods before the times of t2 and t4 in FIG. 4). Accordingly, the driving force which acts in the direction of accelerating the oscillation of the movable plate 2 decreases, and the decrease of the oscillation angle of the movable plate 2 can occur. In the present preferred embodiment, even in case that the phase difference to be corrected is large and the duty ratio thereby needs to be changed significantly, the oscillation angle of the movable plate 2 can be maintained once the control circuit 14 also changes the voltage of the pulse voltage as described above. The value of the pulse voltage which is changed simultaneously with the control circuit 14 changing the duty ratio and so on can be experimentally evaluated and set in advance, for example, and moreover, it is also applicable that a degree of control is designated by a user and so on.

As described above, the one axis mirror element 1 is described in the present invention, however, the two axis mirror element, which is actually used in the image display apparatus 100, is also controlled by the control circuit 14 basically and substantially in the manner described above. That is to say, the control circuit 14 is adapted to be able to change the duty ratio, the voltage, and so on of each pulse voltage to oscillate the movable plate 2 around the rotation axis as described above. Consequently, the phase and the oscillation angle can be adjusted with respect to the oscillation of the movable plate 2 around each rotation axis, and the image can thereby be displayed properly.

As described above, in the present preferred embodiment, the control circuit 14 can adjust the duty ratio, the voltage, and so on of the pulse voltage in accordance with the actual oscillation of the movable plate 2 and can change the timing of applying the voltage and the voltage itself in accordance with the oscillation of the movable plate 2. It is possible to oscillate the movable plate 2 in a desired phase which enables the proper reflection of the light outputted from the light source unit 30, so that the image can be displayed properly. Moreover, the mirror element 1 needs not have a special structure, however, the control circuit 14, which has the simple configuration of only changing the duty ratio and voltage of the pulse voltage by the simple control, enables the adjustment of the oscillation angle and phase of the movable plate 2. Consequently, the cost of manufacturing the image display apparatus 100 can be reduced.

The present invention is not limited to the configuration of the above preferred embodiment, however, various modification are applicable within the scope of the invention. For example, the control circuit can be adapted to control the duty ratio adjusting unit, the voltage adjusting unit, and the frequency adjusting unit in accordance with instructions as to an image size setting and so on from a user and also oscillates the movable plate 2 by changing the duty ratio, voltage, and so on of the pulse voltage to reflect the instructions. Moreover, for example, the duty ratio adjusting unit, the voltage adjusting unit, and the frequency adjusting unit are not limited to have the configuration that the duty ratio and so on of the pulse voltage are changed under control of the control circuit, however, they can be adapted to have the configuration that the duty ratio, the voltage, and so on are changed when a resistance value and so on of an electrical circuit are arbitrarily changed externally. In this case, while a surveyor actually displays the image, the duty ratio and so on of the pulse signals can be adjusted to display the image properly during an assembling process of the image display apparatus, for example. Consequently, the quality of the image display apparatus can be improved by the configuration which enables the reduction in cost of manufacturing the image display apparatus comparatively.

Moreover, the movable plate of the optical scanning device can have not only the rectangular shape but also the other shape including a circular shape, for example. As well as the oscillation detecting unit which detects the electrostatic capacitance as described above, a unit which detects the oscillation angle of the movable plate using a photo sensor or the like or detects the oscillation of the movable plate in a distortion of the torsion spring is also applicable, for example. When the oscillation angle of the movable plate can be detected as described above, the control circuit can control the movable plate more certainly to oscillate at a predetermined oscillation angle by changing the duty ratio and voltage of the pulse voltage. Furthermore, the present invention is applied not only to the optical scanning device which includes the movable plate provided with the mirror film and the image display apparatus using the optical scanning device, however, it is widely applicable to an oscillating device using a movable structure which includes a movable plate, which is swingably driven by a vertical comb, an apparatus which mounts the oscillating device, and so on.

The present invention is based on Japanese Patent Application No. 2007-137195, and as a result, the subject matter is to be combined with the present invention with reference to the specification and drawings of the above patent application.

Although the present invention is fully described by the preferred embodiments with reference to the accompanying drawings, it is clear to the person having ordinary skill in the art that the various changes and modifications are applicable. Consequently, such changes and modifications do not depart from the scope of the present invention but are to be included in the scope of the present invention.

The invention claimed is:

1. An oscillating device comprising:
 a movable structure including a movable plate, torsion springs to pivotally support the movable plate, a frame to support the torsion springs, and a vertical comb with plural comb teeth provided on a part of the movable plate and the frame, which faces with the movable plate, to engage with each other; and
 a voltage applying means to apply a pulse voltage to a comb-like electrode of the vertical comb on the movable plate and a comb-like electrode of the vertical comb on the frame, wherein
 the voltage applying means includes a duty ratio adjusting means which adjusts a duty ratio of the pulse voltage applied to the vertical comb.

2. The oscillating device according to claim 1 further comprising an oscillation detecting means to detect an oscillation of the movable plate, wherein
 a feedback control is performed on the duty ratio adjusting means in accordance with the oscillation of the movable plate detected by the oscillation detecting means.

3. The oscillating device according to claim 2, wherein
 the voltage applying means further includes a control means to control a voltage and frequency of the pulse voltage.

4. An optical scanning device comprising the oscillating device described in claim 1, wherein
 the movable plate in the oscillating device has a mirror to scan a light which enters the mirror.

5. An image display apparatus including the optical scanning device described in claim 4 and a light source unit to enter the light in the optical scanning device based on image signals and displaying an image by reflecting the light which is entered from the light source unit using the optical scanning device, wherein
 the duty ratio adjusting means is controlled according to a timing of the image signals, so that a duty ratio of a pulse voltage is adjusted.

6. A control method of an oscillating device having a movable structure which includes a movable plate, torsion springs to pivotally support the movable plate, a frame to support the torsion springs, and a vertical comb with plural comb teeth provided on a part of the movable plate and the frame, which faces with the movable plate, to engage with each other and swingably driving the movable plate by applying the pulse voltage to the comb-like electrode of the vertical comb on the movable plate and the comb-like electrode of the vertical comb on the frame, wherein
 by adjusting a duty ratio of the pulse voltage, a period for applying the voltage to the vertical comb is changed when the movable plate is oscillated and an oscillation phase of the movable plate is also changed.

7. An optical scanning device comprising the oscillating device described in claim 2, wherein
 the movable plate in the oscillating device has a mirror to scan a light which enters the mirror.

8. An image display apparatus including the optical scanning device described in claim 7 and a light source unit to enter the light in the optical scanning device based on image signals and displaying an image by reflecting the light which is entered from the light source unit using the optical scanning device, wherein the duty ratio adjusting means is controlled according to a timing of the image signals, so that a duty ratio of a pulse voltage is adjusted.

9. An optical scanning device comprising the oscillating device described in claim 3, wherein the movable plate in the oscillating device has a mirror to scan a light which enters the mirror.

10. An image display apparatus including the optical scanning device described in claim 9 and a light source unit to enter the light in the optical scanning device based on image signals and displaying an image by reflecting the light which is entered from the light source unit using the optical scanning device, wherein the duty ratio adjusting means is controlled according to a timing of the image signals, so that a duty ratio of a pulse voltage is adjusted.

* * * * *